United States Patent
Devito et al.

(10) Patent No.: US 10,453,576 B2
(45) Date of Patent: Oct. 22, 2019

(54) CHEMICAL PROCESS FOR PRIMARY SYSTEM MATERIAL PASSIVATION DURING HOT FUNCTIONAL TESTING OF NUCLEAR POWER PLANTS

(71) Applicant: WESTINGHOUSE ELECTRIC COMPANY LLC, Cranberry Township, PA (US)

(72) Inventors: Rachel L. Devito, Gibsonia, PA (US); Jason P. Mazzoccoli, Pittsburgh, PA (US); Edward J. Silva, Vernon, CT (US); Deborah J. Buckley, Evans City, PA (US); Richard J. Jacko, Murrysville, PA (US); William A. Byers, Murrysville, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 521 days.

(21) Appl. No.: 14/812,051

(22) Filed: Jul. 29, 2015

(65) Prior Publication Data

US 2016/0035442 A1 Feb. 4, 2016

Related U.S. Application Data

(60) Provisional application No. 62/030,850, filed on Jul. 30, 2014.

(51) Int. Cl.
  *G21C 17/022* (2006.01)
  *G21C 21/00* (2006.01)
  *C23F 11/18* (2006.01)

(52) U.S. Cl.
  CPC .......... *G21C 17/0225* (2013.01); *C23F 11/18* (2013.01); *C23F 11/187* (2013.01); *G21C 21/00* (2013.01)

(58) Field of Classification Search
  CPC ..... G21C 17/0225; C23F 11/18; C23F 11/187
  See application file for complete search history.

(56) References Cited

U.S. PATENT DOCUMENTS 5,171,515 A * 12/1992 Panson .............. G21C 17/0225
                                                        376/306
2011/0075785 A1* 3/2011 Nishimura ......... G21C 17/0225
                                                        376/306

FOREIGN PATENT DOCUMENTS

EP         2312588 A1    4/2011
JP       08-220293 A    8/1996
(Continued)

OTHER PUBLICATIONS

Betova, Iva, Martin Bojinov, and Timo Saario."Start-up and Shutdown Water Chemistries in Pressurized Water Reactors." Jan. 25, 2012. Relevant excerpts attached.*

(Continued)

*Primary Examiner* — Lily C Garner
(74) *Attorney, Agent, or Firm* — Eckert Seamans Cherin & Mellott, LLC (57) ABSTRACT

The present invention relates to a pre-core hot functional testing (HFT) preconditioning process, which includes the introduction of chemical additives, e.g., zinc, into coolant water that circulates through the primary system of a new nuclear power plant, at various temperatures. The chemical additives contact the primary system surfaces, which results in the formation of a protective zinc-containing oxide film on the fresh surfaces to control corrosion release and deposition during subsequent normal operation of the nuclear power plant. The method includes a series of three chemistry phases to optimize the passivation process: 1) an alkaline-reducing phase, 2) an acid-reducing phase and 3) an acid-oxidizing phase.

14 Claims, 3 Drawing Sheets

(56) References Cited

FOREIGN PATENT DOCUMENTS

| JP | 2003-028985 A | 1/2003 |
| JP | 2010043956 A | 2/2010 |
| WO | 2010065092 A2 | 6/2010 |

OTHER PUBLICATIONS

International Searching Authority, International Search Report and the Written Opinion for International Application No. PCT/US2015/042603, dated Dec. 22, 2015.
Iva Betova et al., Start-up and Shut-down Water Chemistries in Pressurized Water Reactors, VTT Research Report VTT-R-00699-12, Jan. 25, 2012, 10 pages.
Su Shujuan, Overview of Water Chemistry in Nuclear Power Plants, Beijing: Atomic Energy Press, Sep. 2010, 8 pages
Hayakawa et al., Zinc Injection from Hot Functional Test (HFT) in Tomari Unit 3, Nuclear Plant Chemistry Conference 2010 (NPC 2010), Quebec City, Quebec, CA (Oct. 3-7, 2010), Curran Associates, Inc. (2011), Session 1: PWR, VVER and CANDU®/PHWR Operating Experience Posters (Paper 1.15P):312-328.

\* cited by examiner

MILESTONES:

1. Establish hydrazine target prior to exceeding 150°F in RCS
2. Establish low oxygen prior to exceeding 250°F in bulk coolant and pressurizer
3. Initiate addition of lithium, hydrogen, and zinc at ≥ 350°F
4. Establish lithium, hydrogen, and zinc targets prior to NOT Plateau (557°F)
5. Borate at end of NOT Plateau (557°F)
6. Complete degassing of hydrogen in preparation for controlled oxygenation
7. Add hydrogen peroxide once < 180°F in bulk coolant and pressurizer

*FIG.1*

FIGURE 2: Example of "primer" passivation oxide crystals on electropolished Alloy 690 surfaces that had experienced a simulated Hot Functional Test with zinc.

FIGURE 3: Example of passivation oxide crystals on machined Alloy 690 surfaces that had experienced a simulated Hot Functional Test with zinc.

CHEMICAL PROCESS FOR PRIMARY SYSTEM MATERIAL PASSIVATION DURING HOT FUNCTIONAL TESTING OF NUCLEAR POWER PLANTS

CROSS REFERENCE TO RELATED APPLICATION

This application claims priority to U.S. Provisional Patent Application Ser. No. 62/030,850, filed Jul. 30, 2014, entitled CHEMICAL PROCESS FOR PRIMARY SYSTEM MATERIAL PASSIVATION DURING HOT FUNCTIONAL TESTING OF NUCLEAR POWER PLANTS, the content of which is incorporated by reference in its entirety.

BACKGROUND

1. Field

This invention relates generally to hot functional testing of nuclear power plants and, more particularly, to the development of protective oxide films on primary system material during hot functional testing.

2. Related Art

Nuclear power plants generally include a primary system, which includes a reactor vessel, steam generators, reactor coolant pumps, pressurizer and connecting piping. A reactor coolant loop includes a reactor coolant pump, a steam generator and piping that connects these components to the reactor vessel. Nuclear power plants can have two, three or four reactor coolant loops. The nuclear fuel is contained in the reactor core, which is housed in the reactor vessel. A function of the primary system is to transfer heat from the nuclear fuel to the steam generator.

In order for the primary system to perform its function, coolant water circulates through the primary system. System materials and surfaces that are contacted by the coolant water will undergo general corrosion. The development of passive, e.g., protective, oxide films on primary side surfaces, e.g., metal surfaces, is important for controlling corrosion of the materials and component, and for controlling corrosion product release during power operation. As metal corrodes, metal oxide is generated. A portion of the metal oxide forms an adherent layer on the primary side surfaces and a remainder of the metal oxide is released into the coolant water. As the adherent oxide layer develops, it becomes increasingly passive, e.g., protective, and slows the corrosion reaction with the metal surfaces, and eventually the corrosion reaction is reduced to a low, steady state value.

The primary system in Pressurized Water Reactors (PWRs) is the Reactor Coolant System (RCS). In PWRs, corrosion occurs and deposits form when structural materials in the RCS are exposed to high temperature reactor coolant during plant operation. These corrosion products are subsequently released into the reactor coolant and can deposit on the fuel in the reactor core. Historically, significant effort has been expended in the selection of corrosion resistant materials, as well as development of chemistry control additives and plant operating practices to minimize corrosion formation and deposition. During normal plant operation, chemistry control is used to develop passive films on primary system materials and surfaces to control the corrosion rate and corrosion release rate during power operation, in order to minimize the deposition of corrosion products on the core as "crud" and subsequent activation. This is necessary to minimize the risk for crud-related fuel performance issues and plant dose rates.

New nuclear plants undergo hot functional testing (HFT) prior to loading fuel into the nuclear core (pre-core) to demonstrate operability of the plant. During pre-core HFT, an initial (primer) oxide layer develops on surfaces in the primary system, e.g., RCS, upon initial exposure to high temperature coolant water. Following pre-core HFT, during subsequent commercial operation of the nuclear plant, this primer oxide layer impacts the inventory of corrosion products available to deposit on the core and, thereby, impacts fuel crud risks and plant dose rates. Thus, it is believed that the primer oxide layer affects the corrosion resistance for the life of the nuclear power plant.

PWRs that started-up in the 1970's and 1980's had performed HFT using only lithium hydroxide for chemistry control of the primary system, in order to maintain an alkaline pH. Since that time, plants have performed HFT using dissolved hydrogen as well, to develop more protective oxides on RCS surfaces. Also, at least one plant has used boric acid and hydrogen peroxide during HFT to simulate the chemistry conditions during a refueling shutdown, which results in the dissolution of corrosion products such that they can be easily removed from the system by ion exchange.

In the commercial operation of nuclear plants, experience has shown that there are benefits to be derived from zinc injection. For example, it has been found that as zinc is incorporated into existing corrosion films on primary system surfaces, e.g., RCS surfaces, the oxides become more stable and protective, inhibiting both general and localized corrosion. The vast majority of PWRs performing zinc injection are mature plants that started this process after a significant period of operation, e.g., 15 to 20 years, with normal primary water chemistry. The zinc is only injected at normal operating temperatures during power operation. Thus, in these mature plants, the existing oxide films have been formed and established on metal surfaces as a result of continued plant operation. Nickel and cobalt atoms are present in the existing oxide films, and zinc injection is used to restructure the existing oxide films. The restructuring process can continue over many fuel cycles until the existing oxide films are restructured with high concentrations of zinc and chromium present near the metal oxide interface. Zinc injection in operating nuclear plants can cause the additional release of particulate or dissolved corrosion products into the coolant as the zinc atoms are incorporated into the existing oxide films and they replace or displace other atoms, e.g., nickel and cobalt atoms. The release of these additional corrosion products into the coolant can increase the concentration of corrosion products circulating in the primary system, which can increase the amount of material available to deposit on the fuel and thereby, potentially increase the risk for fuel performance issues.

This additional risk limits the concentration of zinc that can be used during power operation, especially for PWRs with higher subcooled nuclear boiling. The subcooled boiling process provides a mechanism for circulating corrosion products to concentrate and deposit at the cladding surface of the nuclear fuel element in the reactor core. Crud deposition occurs in areas of the reactor core undergoing subcooled boiling to a much greater extent than on non-boiling surfaces. Once porous crud deposits are present, the boiling process also provides a mechanism to concentrate any contaminants in the coolant within the crud layer. Increased crud deposition may lead to increased risk of Crud Induced Power Shift (CIPS), also known as Axial Offset Anomaly (AOA). The risk of Crud Induced Localized Corrosion (CILC) may also be increased. CIPS occurs when crud deposits become sufficiently extensive and sub-cooled boiling rates are sufficiently high to result in precipitation of significant amounts of lithium-boron compounds within the crud layer. This results in a shift in axial power distribution away from the boron deposits. Locally, thick crud deposits can also reduce heat transfer and increase fuel cladding temperatures, which can lead to CILC.

Another concern associated with adding zinc to coolant water in an operating nuclear plant is the potential for zinc oxide or zinc silicate to deposit within the crud of the fuel cladding. Such deposition may decrease the transfer through porous crud and thereby, potentially increase fuel cladding corrosion. The likelihood of this scenario can increase if the boiling concentration process within the crud causes the zinc concentration to exceed the solubility limit of either zinc oxide or zinc silicate. To reduce or preclude these fuel risks in an operating nuclear power plant, the level of zinc in the coolant is monitored and controlled, and typically limited to 40 ppb or less during power operation.

It has been found that pre-core HFT provides a unique opportunity to initiate the development of protective oxide films on primary system surfaces and to remove releasable corrosion products, which can prevent deposition and neutron activation during power operation. Further, since the nuclear plant has not been operating prior to pre-core HFT, no existing oxide films have been formed and therefore, the initial protective oxide films formed on the RCS surfaces during pre-core HFT can include zinc incorporated therein without the need to restructure existing films. Tomari 3 in Japan was the first PWR in the world to inject zinc during hot functional testing, but the levels used were similar to that during power operation, i.e., 3 to 7 ppb. Since fuel is not loaded during pre-core HFT, the amount of zinc injected into the coolant water can be increased without the risk of fuel-related concerns and issues. Thus, there is a need in the art to improve the control of reactor coolant chemistry during pre-core HFT as a preconditioning process to passivate the RCS surfaces prior to normal power operation of a nuclear power plant, in order to control corrosion and optimize the long-term integrity and performance of plant systems in the nuclear power plant. This will also significantly reduce the inventory of corrosion products available to deposit on the fuel and become activated during normal power operation, thereby improving fuel performance and minimizing plant dose rates.

SUMMARY

This invention achieves the foregoing objectives by providing a method of passivating a metal surface in a primary system of a nuclear power plant, having a nuclear core and coolant water flowing through the primary system. The method includes adding zinc to the coolant water during hot functional testing and prior to an initial loading of fuel in the nuclear core of the nuclear power plant, allowing the zinc to contact the fresh metal surfaces in the primary system, and forming an initial zinc-containing oxide film on the metal surface.

In certain embodiments, the nuclear power plant is a pressurized water reactor and the primary system is a reactor coolant system.

The zinc can have a concentration from about 5 to about 300 ppb or from greater than about 10 to about 300 ppb or from greater than about 40 to about 300 ppb or from about 5 to about 100 ppb or from greater than about 10 to about 100 ppb or from greater than about 40 to about 100 ppb. The zinc can be zinc acetate.

The method can further include adding a base, e.g., hydroxide, to the coolant water. The base can be in a concentration sufficient for the coolant water to have an alkaline pH from about 6.9 to about 7.4 at the operating temperature or from about 9.5 to 10.1 at 25° C. The base can be selected from lithium hydroxide, potassium hydroxide and mixtures thereof. The concentration of lithium can be from about 0.3 to about 2.0 ppm.

The method can further include adding boric acid to the coolant water. The concentration can be about 100 ppm boron or less.

The method can further include adding hydrogen to the coolant water. The hydrogen may be present in the coolant water in an amount of at least about 4 cc/kg or from about 4 to about 50 cc/kg or from about 4 to about 15 cc/kg or from about 15 to about 30 cc/kg, or about 4.5 cc/kg.

The coolant chemistry is controlled through a series of temperature hold points or "plateaus" that are maintained for system testing as the RCS is brought up to normal operation temperature and then back down to ambient temperature in a plant-specific manner. In certain embodiments, adding the zinc and/or lithium and/or hydrogen is initiated when the temperature of the coolant water is about 350° F. or higher.

The invention also provides a method for passivating a metal surface in a primary system of a new nuclear power plant during pre-core hot functional testing. The nuclear power plant has a nuclear core and coolant water flowing through the primary system. The method includes initiating an alkaline-reducing phase, followed by initiating an acid-reducing phase and followed by initiating an acid-oxidizing phase. The alkaline-reducing phase includes adding hydroxide in an amount sufficient to maintain the coolant water at an alkaline pH and adding zinc to the coolant water. The zinc is allowed to contact the metal surface in the primary system and form a zinc-containing oxide film on the metal surface. The acid-reducing phase includes borating the coolant water to about 500 ppm boron or greater to achieve a pH at 25° C. of about 4.0 to 5.6. In certain embodiments, zinc may continue to be injected during this phase. The acid-oxidizing phase includes adding an oxidizing agent to the coolant water.

Prior to initiating the alkaline-reducing phase, an oxygen scavenger, such as, but not limited to, hydrazine can be added to the coolant water. The oxygen scavenger can be added when the coolant water temperature is about 250° F. or lower, or about 150° F. or lower. In certain embodiments, the oxygen scavenger is added in an amount of about 1.5 times the stoichiometric amount of oxygen. In other embodiments, the oxygen scavenger is added in an amount such that the resultant oxygen level in the coolant water is less than about 100 ppb.

The alkaline-reducing phase can be conducted at a temperature of about 350° F. or higher. In certain embodiments, the alkaline-reducing phase can be conducted at a temperature that simulates normal operating temperature of the nuclear power plant. In certain embodiments, the normal operating temperature is from about 500° F. to about 600° F.

Adding the oxidizing agent, e.g., hydrogen peroxide, for the acid-oxidizing phase can be initiated when the water coolant temperature is about 180° F. or lower.

The invention further provides a method of controlling the addition of zinc into coolant water flowing through a primary system and a nuclear core of a nuclear power plant during preconditioning of the nuclear power plant and prior to an initial fuel loading and normal power operation. The method includes initiating an alkaline-reducing phase, which includes adding zinc to the coolant water in an amount sufficient to provide a concentration from about 5 to about 300 ppb in the coolant water and at least one compound selected from hydroxide and hydrogen, and increasing the coolant water temperature to normal operating temperature to initiate a NOT plateau; then initiating an acid-reducing phase, which includes adding boric acid to the coolant water at or near the end of the NOT plateau and, optionally, adding zinc; and then initiating an acid-oxidizing phase, which includes adding an oxidizing agent to the coolant water.

BRIEF DESCRIPTION OF THE DRAWINGS

A further understanding of the invention can be gained from the following description of the preferred embodiments when read in conjunction with the accompanying drawing in which.

DESCRIPTION OF THE PREFERRED EMBODIMENT

The invention generally relates to preconditioning, e.g., passivating, primary system surfaces in a nuclear power plant. The preconditioning includes developing initial (primer) passivation films on primary system surfaces during pre-core hot functional testing (HFT) of a new nuclear power plant. Passive films are instrumental in contributing to controlling corrosion on primary system surfaces and corrosion release during nuclear power plant operation. In accordance with the invention, the preconditioning process is conducted prior to the initial loading of nuclear fuel in the reactor core and prior to initiating normal operation of the new nuclear power plant. Therefore, the preconditioning precedes the development of passivation films on primary system surfaces that typically exist in nuclear power plants due to normal plant operation. This preconditioning process can be conducted at specified chemistry and time-at-temperature conditions. The preconditioning can include the following three phases: 1) an alkaline-reducing phase, 2) an acid-reducing phase and 3) an acid-oxidizing phase. Certain chemical addition and temperature conditions can be associated with each of the phases. In general, the majority of HFT is conducted in the alkaline-reducing phase, and at least a majority of the alkaline-reducing phase is conducted at a temperature which simulates normal operating temperature (NOT) of a nuclear power plant. NOT can vary and may depend on a particular type and design of nuclear power plant. For example, the Westinghouse AP1000® PWR design has a NOT of about 557° F.

In general, the HFT preconditioning process includes the introduction of additives, e.g., zinc, into coolant water that circulates through the primary system of a nuclear power plant and contacts the primary system surfaces, which results in formation of a chromium-rich oxide with zinc incorporated at the metal-oxide surface to control corrosion release during subsequent normal plant operation.

For ease of description, the preconditioning process in accordance with the invention is described for a nuclear power plant having a Pressurized Water Reactor (PWR) and Reactor Coolant System (RCS) as the primary system. The duration of preconditioning and, in particular, the duration of each phase within the preconditioning process, can vary and is typically determined by the amount of time that is needed for various system tests to be performed. In certain embodiments, the time for each of the three phases can be predetermined and extended beyond the time needed to perform conventional testing, such that there are hold points for the preconditioning passivation process. Further, the temperatures at which each of the phases is initiated or terminated are exemplary and may vary based on the design and operation of a specific plant.

Prior to initiating pre-core HFT, the RCS is filled with demineralized water. An oxygen scavenger, such as hydrazine, is added to the RCS and pressurizer at low temperatures to scavenge oxygen in the reactor coolant. Hydrazine addition is known in the art to control concentrations of dissolved oxygen in nuclear plants. The amount of hydrazine added can vary and is typically such that the resultant oxygen level in the coolant water is at or below 100 ppb. In certain embodiments, the hydrazine is added at 1.5 times the stoichiometric amount of oxygen present. The hydrazine can be added at various temperatures and is typically added at a reactor coolant temperature of about 250° F. or lower, or about 150° F. or lower.

Following the addition of hydrazine and the initiation of heatup, chemical additions to establish preconditioning chemistry to initiate the alkaline-reducing phase can begin when the reactor coolant temperature reaches or exceeds about 350° F. This phase includes the addition of zinc. Also, a base, e.g., hydroxide, can be added to the reactor coolant to maintain an alkaline pH for controlling corrosion and the corrosion product release rate. The base, e.g., hydroxide, can be in a concentration sufficient for the coolant water to have an alkaline pH. In certain embodiments, the pH is from about 6.9 to about 7.4 at the operating temperature or from about 9.5 to about 10.1 at 25° C. Suitable bases, e.g., hydroxides, for use in the invention are known in the art and include, but are not limited to, lithium hydroxide and potassium hydroxide, and mixtures thereof. Wherein the base is lithium hydroxide, the concentration of lithium is controlled to establish a reactor coolant pH in HFT that simulates reactor coolant pH during normal power operation. In certain embodiments, the lithium concentration is from about 0.3 to about 2.0 ppm or about 0.5 ppm. The amount of lithium hydroxide will be controlled to provide an at-temperature pH, i.e., pHT, that is within a range considered optimal for normal power operation based on industry experience.

The zinc concentration maintained during HFT is significantly higher than the levels typically used during power operation. Typically, the concentration of zinc added during normal power operation is about 5 to 10 ppb, with a maximum of 40 ppb. As previously indicated, it is known that zinc can negatively impact fuel performance during nuclear power operations and therefore, the concentration of zinc is limited based on the fuel risks associated therewith. Since fuel is not present during pre-core hot functional testing, the risk for zinc to impact the performance of the fuel is not a concern. Furthermore, without intending to be bound by any particular theory, it is believed that since a new plant has fresh metal surfaces (as opposed to a mature operating plant having existent oxide films formed on metal surfaces), a significant amount of zinc will be incorporated into the newly formed film, which leads to a highly stable and protective oxide with fewer defects in the oxide lattice. Fewer defects is effective to reduce the electronic and ionic conductivity of the oxide film, which limits further corrosion reactions at the metal-oxide interface and at the oxide-solution interface. As a result, the corrosion product release rates are lower, and there is increased suppression of radio-cobalt incorporation into RCS surfaces. It is therefore desirable to maximize the zinc exposure prior to power operation. In certain embodiments, in accordance with the invention, the zinc concentration in the reactor coolant during pre-core HFT is from about 5 to about 300 ppb or from greater than about 10 to 300 ppb or from greater than about 40 to about 300 ppb or from about 5 to about 100 ppb or from greater than about 10 to 100 ppb or from greater than about 40 to about 100 ppb. It is desirable to maximize the amount of zinc exposure prior to power operation, while still maintaining the zinc concentration below the solubility limit.

In addition to lithium and zinc, hydrogen also may be added during the alkaline-reducing phase to maintain a reducing chemistry environment and to produce oxides on the RCS surfaces that are similar to those that will be stable during normal plant operation. In certain embodiments, the dissolved hydrogen concentration in the reactor coolant is in an amount of at least about 4 cc/kg or from about 4 to about 50 cc/kg or from about 4 to about 15 cc/kg or from about 15 to about 30 cc/kg, or about 4.5 cc/kg. Thus, during the alkaline-reducing phase, the combination of lithium, hydrogen, and zinc can be employed to develop initial (primer) protective chromium and zinc-rich oxide films on primary system surfaces.

In certain embodiments, a low level of boric acid, such as, about 100 ppm boron or less, can also be added to the reactor coolant. The boric acid may be beneficial for preventing stress corrosion cracking of stainless steel due to concentration of lithium hydroxide. The addition of boric acid is also particularly favorable because boric acid is known to modify the zeta potential of oxides generated in the reactor coolant system, the electrical charge on oxide particles in the RCS, for the purposes of better suspending the particles for their removal from the RCS.

In the alkaline-reducing phase, the chemistry additions are performed and the preconditioning chemistry of the coolant water is established prior to reaching normal operating temperature (NOT). During the time period when HFT is at NOT, which may be referred to as the NOT Plateau, various tests may be conducted. The preconditioning chemistry of the coolant water is maintained throughout the remainder of the alkaline-reducing phase until the coolant water is borated. Near the end of the NOT Plateau, e.g., at the end of the alkaline-reducing phase, the reactor coolant is borated, e.g., with the addition of boric acid, to initiate the acid-reducing phase.

In the acid-reducing phase, boric acid is added and lithium hydroxide is removed from the reactor coolant to simulate plant shutdown chemistry conditions when an acidic environment is created. In certain embodiments, the boron concentration of the reactor coolant is about 500 ppm or greater. The borated reactor coolant is sufficiently acidic relative to neutral pH at elevated temperature (e.g., about 4.0 to 5.6). The acid-reducing phase is initiated as near to the end of the NOT Plateau as is practical to maximize the time period with an alkaline pH prior to borating the coolant water. Upon initiation of the acid-reducing phase, the addition of zinc may be terminated or, optionally, zinc addition may be continued. However, reducing conditions are maintained with continued addition during the acid-reducing phase of hydrogen on an as-needed basis.

The temperature is then reduced and hydrogen is removed from the reactor coolant in preparation for oxygenation of the reactor coolant during the acid-oxidizing phase. An oxidizing agent, such as, but not limited to, hydrogen peroxide, may be used for chemical degassing to facilitate hydrogen removal. In certain embodiments, the oxidizing agent is added in an amount that is sufficient for nickel to remain dissolved (e.g., resulting in about 1 ppm oxygen or greater), such that it can more easily be removed from the system by ion exchange. Further, in certain embodiments, the oxidizing agent, e.g., hydrogen peroxide, is initiated in the acid-oxidizing phase when the reactor coolant temperature is in the range from about 180° F. to about 140° F., and the addition of the oxidizing agent can continue as the temperature further decreases. Furthermore, during the acid-oxidizing phase, zinc continues to be removed, e.g., by Chemical Volume and Control System purification. A residual amount of zinc is expected to remain in the reactor coolant since zinc may be released from RCS surfaces when injection is terminated and as the plant is cooled down. Continued purification to reduce dissolved corrosion products and suspended solids during this phase is conducted, in order to minimize the inventory of corrosion products available to deposit on the core during power operation.

The invention provides various benefits and advantages over the prior art, such as, but not limited to, the ability to control zinc addition during a preconditioning, pre-core phase in a manner that cannot be achieved during normal plant operation and furthermore, the ability to add zinc in a higher concentration during the preconditioning, pre-core phase as compared to post-core normal power operation.

It is contemplated and understood that conventional tests associated with assessing the operability of a new nuclear power plant are carried out during pre-core hot functional testing, including during heatup, e.g., as the reactor coolant temperature increases to NOT, during the time period wherein NOT is maintained, e.g., the NOT Plateau, and during cooldown, e.g., as the reactor coolant temperature decreases from NOT to ambient temperature.

Figure 1:
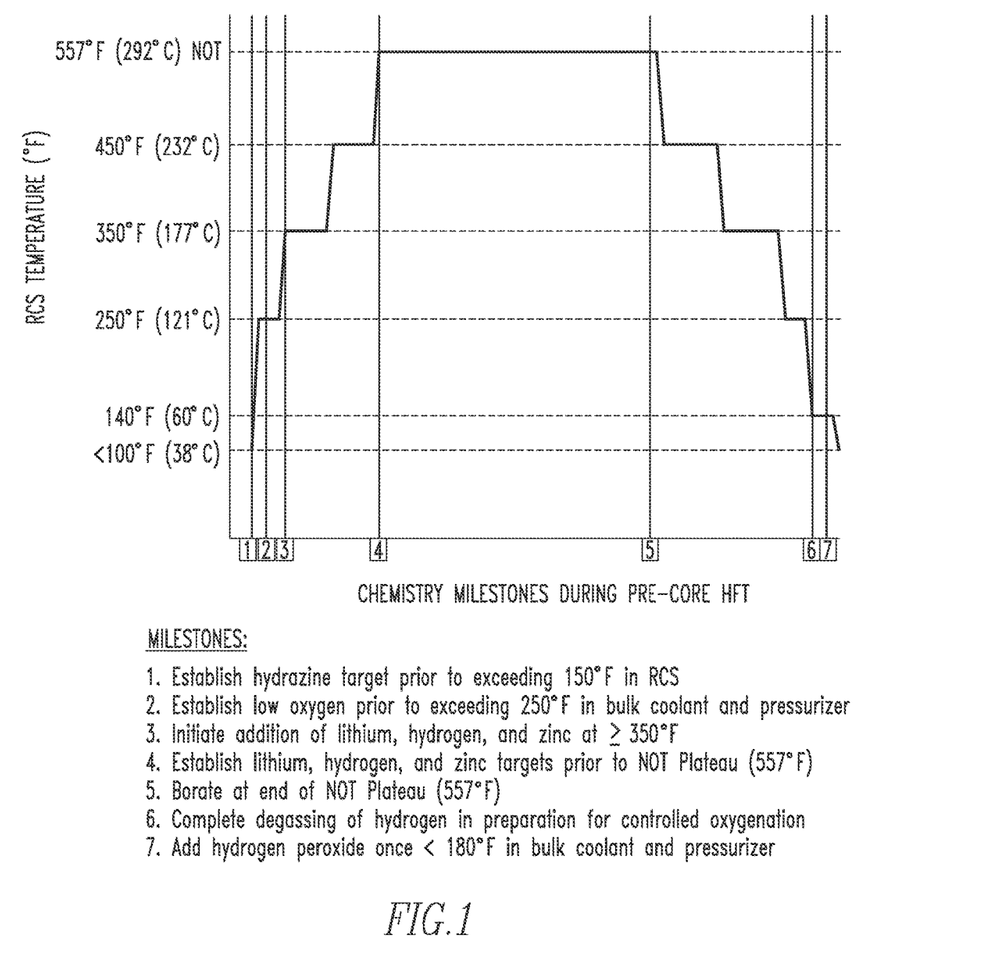
FIG. 1 is a schematic showing chemistry milestones at corresponding Reactor Coolant Temperatures during pre-core hot functional testing, in accordance with certain embodiments of the invention.

In accordance with certain embodiments of the invention, FIG. 1 illustrates chemistry milestones that occur at various RCS temperatures during pre-core HFT. As shown in FIG. 1, various chemistry changes occur throughout temperature plateaus during pre-core HFT. FIG. 1 identifies Milestones 1 through 7. The RCS temperature generally increases or heats up from Milestone 1 to Milestone 4, at which NOT is reached. Following testing at NOT, the RCS temperature generally decreases or cools down. Milestones 1 and 2 take place at the onset of HFT and prior to initiating the alkaline-reducing phase. For Milestone 1, a hydrazine target is established prior to exceeding about 150° F. in the RCS. For Milestone 2, low oxygen is established prior to exceeding about 250° F. in the reactor coolant and pressurizer. Milestone 3 relates to the start of the alkaline-reducing phase and includes initiating the addition of lithium, hydrogen and zinc at a RCS temperature of about 350° F. or higher. As shown in FIG. 1, between Milestones 3 and 4, the RCS temperature increases from about 350° F. to NOT, e.g., about 557° F. Milestone 4 includes establishing lithium, hydrogen and zinc targets prior to NOT to achieve alkaline-reducing conditions. The horizontal line corresponding to a temperature of 557° F. represents the NOT Plateau. As previously described, tests are typically conducted during the NOT Plateau. Testing can also be performed during heatup from ambient to NOT and during cooldown from NOT to ambient. Milestone 5 occurs at the end of the NOT Plateau and includes borating the reactor coolant to achieve acid-reducing conditions. Between Milestones 5 and 6, the RCS temperature decreases. At Milestone 6, degassing of hydrogen is completed in preparation for controlled oxygenation. Milestone 7 is in the acid-oxidizing phase and includes the addition of hydrogen peroxide when the temperature of the reactor coolant and pressurizer is about 180° F. or lower to achieve acid-oxidizing conditions. Corrosion product removal is maximized during this phase, in order to minimize the inventory available to deposit on the fuel and become activated, thereby improving fuel performance and minimizing plant dose rates.

Figure 2:
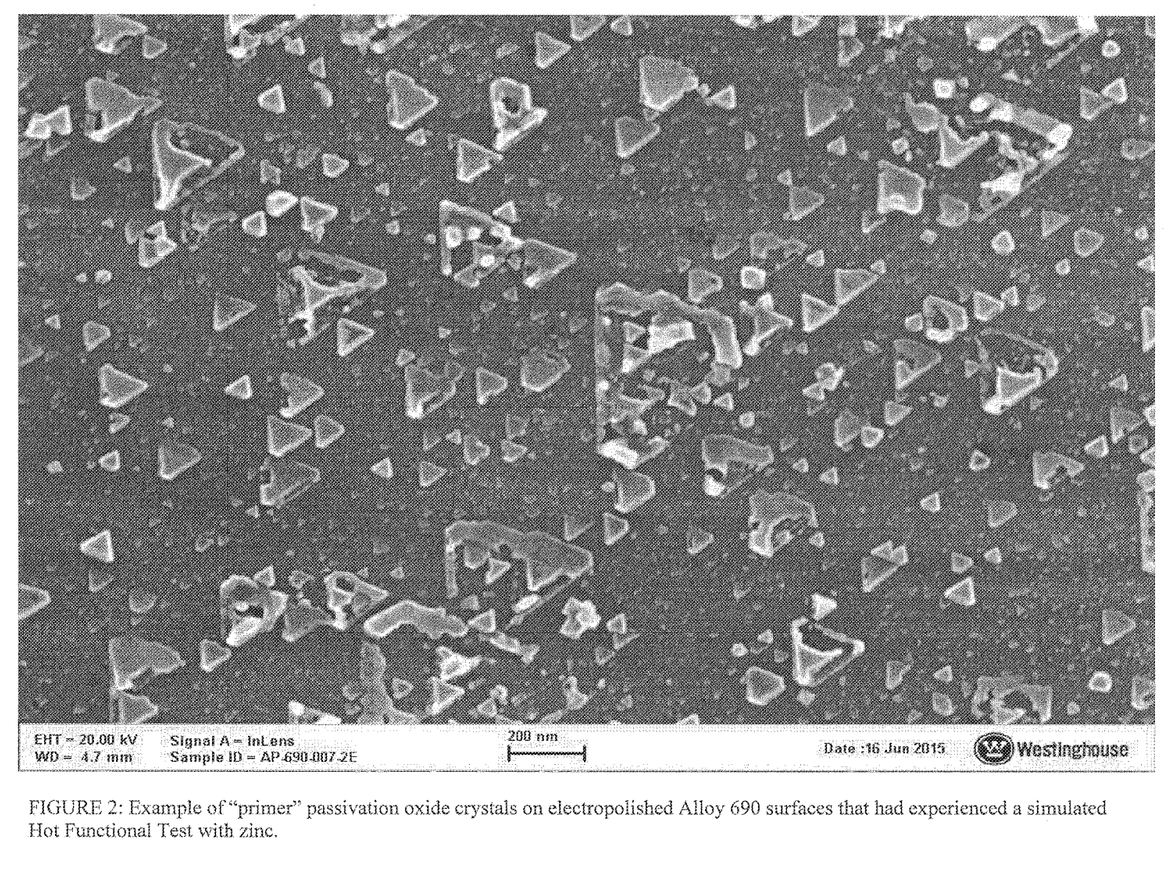
FIG. 2 is an image showing passivation oxide crystals on electropolished Alloy 690 surfaces resulting from simulated hot functional test with zinc.
Figure 3:
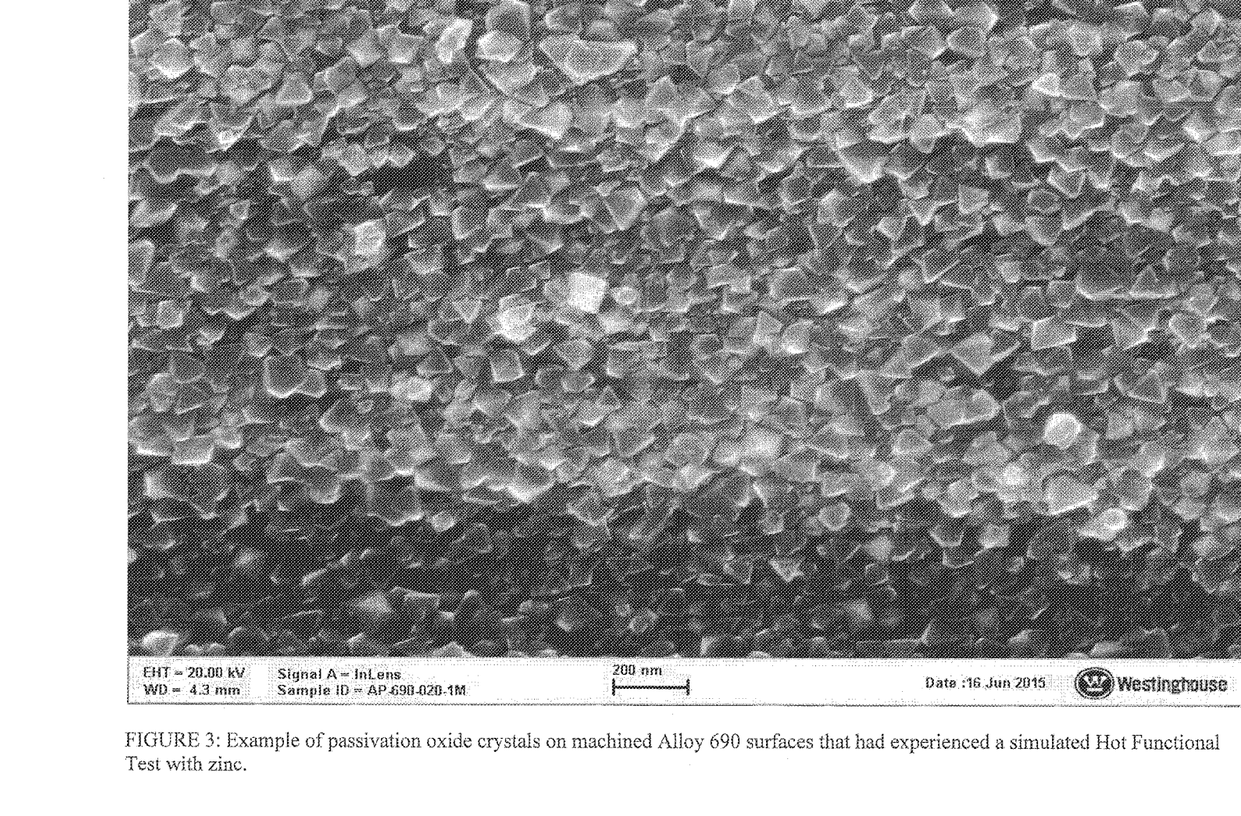
FIG. 3 is an image showing passivation oxide crystals on machined Alloy 690 surfaces resulting from simulated hot functional test with zinc.

In accordance with the invention, a simulation test was conducted using known PWR primary circuit materials, i.e., Alloy 690 and 304 stainless steel coupons. Portions of the surface area of some of the coupons were electropolished prior to the environmental exposure while other coupons were mechanically polished, representative of surface finishes. Corrosion weight loss experiments were conducted in the HFT test with zinc, and the results indicated that negligible corrosion was experienced for the Alloy 690 materials (which represent the highest surface area on the PWR primary system). The passive oxide films on the electropolished Alloy 690 were very fine and protective as shown in FIG. 2. The passive oxide films on the mechanically polished Alloy 690 were more developed but composed of very fine oxide crystals approximately 100 nanometers in size as shown in FIG. 3.

The particular embodiments disclosed are meant to be illustrative only and not limiting as to the scope of the invention which is to be given the full breadth of the appended claims and any and all equivalents thereof.

What is claimed is:

1. A method of passivating a metal surface in a primary system of a new nuclear power plant having a nuclear core and coolant water flowing through the primary system, comprising:
   heating the primary system to a simulated normal operating temperature prior to an initial loading of fuel in the nuclear core;
   initiating an addition of zinc to the coolant water at a temperature greater than or equal to about 350° F. prior to reaching the simulated normal operating temperature;
   achieving a target zinc concentration in the coolant water from greater than 40 to 300 ppb at the simulated normal operating temperature;
   conducting hot functional testing in the primary system at the target zinc concentration and the simulated normal operating temperature;
   allowing the zinc to contact the metal surface in the primary system; and
   forming an initial zinc-containing oxide film on the metal surface.

2. The method of claim 1, wherein the zinc is added in the form of zinc acetate.

3. The method of claim 1, further comprising adding base to the coolant water.

4. The method of claim 3, wherein the base is selected from the group consisting of lithium hydroxide, potassium hydroxide and mixtures thereof.

5. The method of claim 4, wherein the lithium hydroxide has a concentration sufficient for the coolant water to have a pH from 6.9 to 7.4 at the operating temperature or from 9.5 to 10.1 at 25° C.

6. The method of claim 5, wherein the concentration of lithium in the coolant water is from 0.3 ppm to 2.0 ppm.

7. The method of claim 3, further comprising adding boric acid to the coolant water.

8. The method of claim 7, wherein the boric acid is added in an amount to such that there is a concentration of 100 ppm boron or less.

9. The method of claim 3, further comprising adding hydrogen.

10. The method of claim 9, wherein a concentration of the hydrogen in the coolant water is selected from a value or a range consisting of at least 4 cc/kg, from 4 to 50 cc/kg, from 4 to 15 cc/kg, from 15 to 30 cc/kg, and 4.5 cc/kg.

11. The method of claim 9, wherein the adding of the zinc, the lithium hydroxide and the hydrogen is initiated when the coolant water has a temperature of 350° F. or higher and less than the simulated normal operating temperature of the coolant water.

12. A method for passivating a metal surface in a primary system of a new nuclear power plant during pre-core hot functional testing, the nuclear power plant having a nuclear core and coolant water flowing through the primary system, comprising:
    heating the primary system to a simulated normal operating temperature prior to an initial loading of fuel in the nuclear core;
    achieving an alkaline-reducing phase, comprising:
       adding hydroxide in an amount sufficient to maintain the coolant water at an alkaline pH;
       initiating an addition of zinc to the coolant water at a temperature greater than or equal to about 350° F. prior to reaching the simulated normal operating temperature;
       achieving a target zinc concentration in the coolant water from greater than 40 to 300 ppb at the simulated normal operating temperature;
       conducting the pre-core hot functional testing at the target zinc concentration and the simulated normal operating temperature;
    allowing the zinc to contact the metal surface in the primary system; and
    forming a zinc-containing oxide film on the metal surface;
    then initiating an acid-reducing phase, comprising:
       borating the coolant water; and
    then initiating an acid-oxidizing phase, comprising:
       removing hydrogen from the coolant water.

13. The method of claim 12, further comprising adding an oxygen scavenger to the coolant water prior to initiating the alkaline-reducing phase.

14. A method of controlling the addition of zinc into coolant water flowing through a primary system and a nuclear core of a nuclear power plant during a preconditioning prior to an initial fuel load and normal power operation, comprising:
    heating the primary system to a simulated normal operating temperature prior to an initial loading of fuel in the nuclear core;
    achieving an alkaline-reducing phase, comprising:
       initiating an addition of zinc, hydroxide and hydrogen to the coolant water at a temperature greater than or equal to about 350° F. prior to reaching the simulated normal operating temperature;
       achieving a target zinc concentration from greater than 40 to 300 ppb in the coolant water at the simulated normal operating temperature;

establishing a plateau at the simulated normal operating temperature; and
conducting the pre-core hot functional testing at the target zinc concentration during the plateau;
initiating an acid-reducing phase to simulate a plant shutdown chemistry condition, comprising:
adding boric acid to the coolant water; and
initiating an acid-oxidizing phase, comprising:
removing hydrogen from the coolant water.

* * * * *